United States Patent
Wang et al.

(10) Patent No.: US 12,184,412 B2
(45) Date of Patent: Dec. 31, 2024

(54) TRANSPORT BLOCK OVER MULTIPLE SLOTS CODING CHAIN

(71) Applicant: QUALCOMM Incorporated, San Diego, CA (US)

(72) Inventors: Runxin Wang, San Diego, CA (US); Gokul Sridharan, Sunnyvale, CA (US); Hung Dinh Ly, San Diego, CA (US); Peter Gaal, San Diego, CA (US); Sanghoon Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/747,926

(22) Filed: May 18, 2022

(65) Prior Publication Data

US 2023/0099158 A1    Mar. 30, 2023

Related U.S. Application Data

(60) Provisional application No. 63/250,915, filed on Sep. 30, 2021.

(51) Int. Cl.
  *H04L 1/00*     (2006.01)
  *H04L 25/03*    (2006.01)
  (Continued)

(52) U.S. Cl.
  CPC .......... *H04L 1/0057* (2013.01); *H04L 1/0064* (2013.01); *H04L 1/0071* (2013.01);
  (Continued)

(58) Field of Classification Search
  None
  See application file for complete search history.

(56) References Cited

U.S. PATENT DOCUMENTS

2011/0261775 A1* 10/2011 Kim ............... H04L 1/0057
                                                      370/329
2013/0227233 A1    8/2013 Asokan et al.
(Continued)

FOREIGN PATENT DOCUMENTS

CA       3139091 A1    11/2020
WO    2015086044 A1     6/2015

OTHER PUBLICATIONS

Ericsson: "TB Processing over Multi-Slot PUSCH", R1-2107560, 3GPP TSG-RAN WG1 Meeting #106-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038469, 19 Pages, Sections 2.1-2.5.

(Continued)

*Primary Examiner* — Duc T Duong
(74) *Attorney, Agent, or Firm* — QUALCOMM Incorporated

(57) ABSTRACT

A method of wireless communication at a user equipment (UE) includes receiving, from a network node, a message indicating slots for transmitting a transport block on a physical uplink shared channel (PUSCH). The method also includes segmenting the transport block into code blocks. The method further includes encoding the code blocks to produce encoded code blocks. Each code block may be encoded at a coding path from a group of coding paths associated with a coding chain. The method still further includes transmitting the encoded code blocks in the slots on the PUSCH.

26 Claims, 16 Drawing Sheets

(51) Int. Cl.
*H04W 28/04* (2009.01)
*H04W 72/0446* (2023.01)

(52) U.S. Cl.
CPC ....... *H04L 25/03866* (2013.01); *H04W 28/04* (2013.01); *H04W 72/0446* (2013.01)

(56) References Cited

U.S. PATENT DOCUMENTS

| | | | |
|---|---|---|---|
| 2018/0278368 A1* | 9/2018 | Kim | H04L 1/0048 |
| 2019/0363824 A1 | 11/2019 | Sun et al. | |
| 2020/0153549 A1* | 5/2020 | Noh | H04L 1/0009 |
| 2020/0235874 A1* | 7/2020 | Yeo | H04W 72/04 |
| 2020/0274661 A1* | 8/2020 | Yoshioka | H04W 72/1268 |
| 2020/0287695 A1* | 9/2020 | Wu | H04W 72/0446 |
| 2020/0404687 A1* | 12/2020 | Yoshimura | H04W 72/1268 |
| 2021/0136695 A1* | 5/2021 | Liu | H04L 5/0055 |
| 2021/0168836 A1* | 6/2021 | Takeda | H04W 72/1263 |
| 2022/0030590 A1* | 1/2022 | Mu | H04W 72/0446 |
| 2022/0045789 A1* | 2/2022 | Karmoose | H04W 72/1268 |
| 2022/0346091 A1* | 10/2022 | Karmoose | H04L 1/0072 |
| 2023/0188277 A1* | 6/2023 | Cheng | H04L 5/0044 370/329 |
| 2023/0216615 A1* | 7/2023 | Karaki | H04L 5/0044 370/329 |
| 2023/0269024 A1* | 8/2023 | Lee | H04B 7/06 714/750 |
| 2023/0308228 A1* | 9/2023 | Alfarhan | H04L 1/1887 |
| 2023/0354219 A1* | 11/2023 | Yan | H04W 52/42 |
| 2023/0354416 A1* | 11/2023 | Kim | H04W 74/0808 |
| 2024/0179688 A1* | 5/2024 | Echigo | H04W 72/0446 |
| 2024/0224268 A1* | 7/2024 | Ermolaev | H04W 72/1268 |
| 2024/0305419 A1* | 9/2024 | Su | H04L 1/0061 |

OTHER PUBLICATIONS

International Search Report and Written Opinion—PCT/US2022/039416—ISA/EPO—Nov. 16, 2022.

* cited by examiner

TRANSPORT BLOCK OVER MULTIPLE SLOTS CODING CHAIN

CROSS-REFERENCE TO RELATED APPLICATION

The present application claims the benefit of U.S. Provisional Patent Application No. 63/250,915, filed on Sep. 30, 2021, and titled "TRANSPORT BLOCK OVER MULTIPLE SLOTS CODING CHAIN," the disclosure of which is expressly incorporated by reference in its entirety.

FIELD OF THE DISCLOSURE

The present disclosure relates generally to wireless communications, and more specifically to coding a transport block over multiple slots.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The multiple access technologies, such as the technologies discuss above, have been adopted in various telecommunications standards to provide a common protocol that enables different user equipment (UEs) to communicate on one or more of a municipal, national, regional, or global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method for wireless communication by a user equipment (UE) includes receiving, from a network node, a message indicating a group of slots for transmitting a transport block on a physical uplink shared channel (PUSCH). The method further includes segmenting the transport block into a group of code blocks. The method still further includes encoding the group of code blocks to produce a group of encoded code blocks. Each code block may be encoded at a respective coding path of a group of coding paths associated with a coding chain. The method also includes transmitting the group of encoded code blocks in the group of slots on the PUSCH.

Another aspect of the present disclosure is directed to an apparatus including means for receiving, from a network node, a message indicating a group of slots for transmitting a transport block on a PUSCH. The apparatus further includes means for segmenting the transport block into a group of code blocks. The apparatus still further includes means for encoding the group of code blocks to produce a group of encoded code blocks. Each code block may be encoded at a respective coding path of a group of coding paths associated with a coding chain. The apparatus also includes means for transmitting the group of encoded code blocks in the group of slots on the PUSCH.

In another aspect of the present disclosure, a non-transitory computer-readable medium with non-transitory program code recorded thereon is disclosed. The program code is executed by a processor and includes program code to receive, from a network node, a message indicating a group of slots for transmitting a transport block on a PUSCH. The program code further includes program code to segment the transport block into a group of code blocks. The program code still further includes program code to encode the group of code blocks to produce a group of encoded code blocks. Each code block may be encoded at a respective coding path of a group of coding paths associated with a coding chain. The program code also includes program code to transmit the group of encoded code blocks in the group of slots on the PUSCH.

Another aspect of the present disclosure is directed to an apparatus for wireless communications at a UE. The apparatus includes a processor, a memory coupled with the processor and storing instructions operable, when executed by the processor, to cause the apparatus to receive, from a network node, a message indicating a group of slots for transmitting a transport block on a PUSCH. Execution of the instructions further cause the apparatus to segment the transport block into a group of code blocks. Execution of the instructions also cause the apparatus to encode the group of code blocks to produce a group of encoded code blocks. Each code block may be encoded at a respective coding path of a group of coding paths associated with a coding chain. Execution of the instructions still further cause the apparatus to transmit the group of encoded code blocks in the group of slots on the PUSCH.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
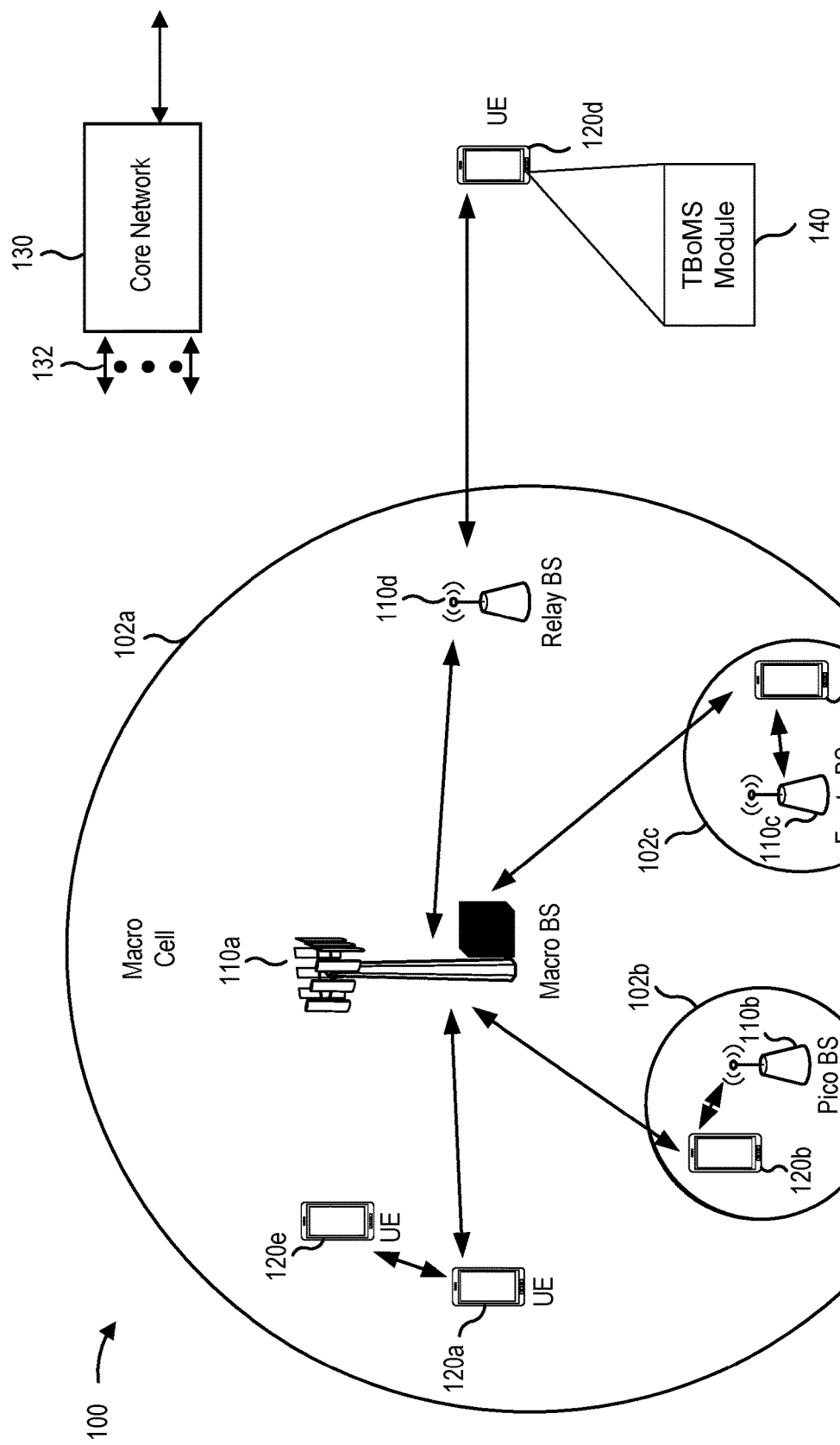
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Various aspects of the disclosure relate to code block segmentation in a wireless communication network. In some examples, a wireless communication device, such as a user equipment (UE), may reserve resources, such as physical uplink shared channel (PUSCH) resources, on a carrier for transmission of a transport block. The reserved resources may span two or more consecutive or non-consecutive slots. The UE may segment (e.g., map) the transport block to the two or more slots. In some examples, the transport block may be segmented before a channel coding stage. In some other examples, the transport block may be segmented to multiple encoded code blocks. In such examples, the multiple encoded code blocks may be segmented to the two or more slots. In some other examples, the multiple encoded code blocks may be concatenated and the concatenated code blocks may be segmented to the two or more slots.

FIG. 1 is a diagram illustrating an example of a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a transport block over multiple slot (TBoMS) module 140. For brevity, only one UE 120*d* is shown as including the TBoMS module 140. The TBoMS module 140 may receive, from a base station, a message indicating multiple slots for transmitting a transport block on a physical uplink shared channel (PUSCH). The TBoMS module 140 may also segment the transport block into multiple code blocks. TBoMS module 140 may further encode the multiple code blocks to produce multiple encoded code blocks, each of the multiple code blocks encoded at a coding chain associated with a respective code block. The TBoMS module 140 may also transmit the multiple encoded code blocks in the multiple slots on the PUSCH.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
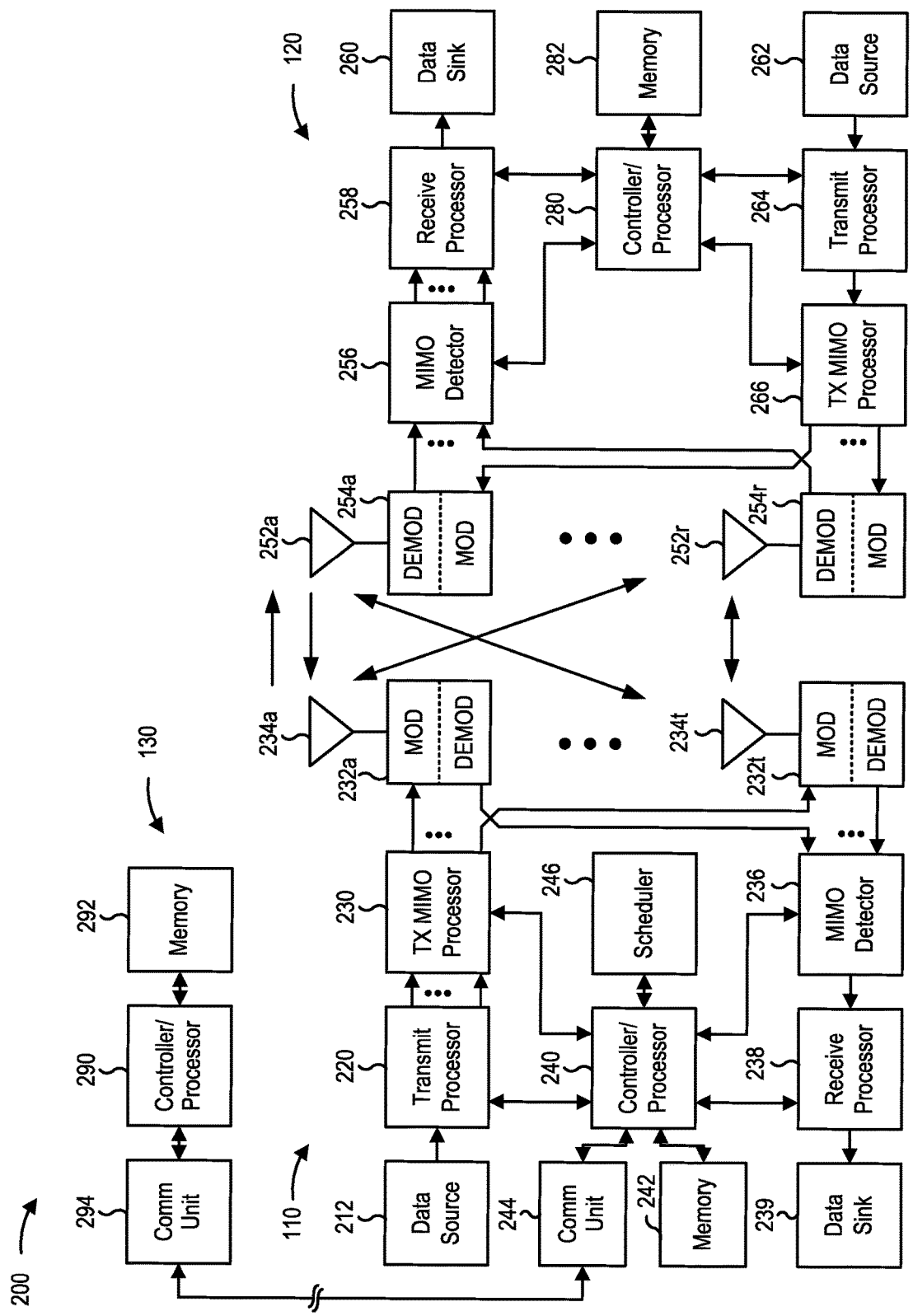
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with segmenting a transport block across multiple slots as described in more detail elsewhere. For example, the controller/processor 240 of the base station 110, the controller/processor 280 of the UE 120, and/or any other component(s) of FIG. 2 may perform or direct operations of, for example, the process of FIG. 6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, from a base station, a message indicating a plurality of slots for transmitting a transport block on a physical uplink shared channel (PUSCH); means for segmenting the transport block into a plurality of code blocks; means for encoding the plurality of code blocks to produce a plurality of encoded code blocks, each of the plurality of code blocks encoded at a coding chain associated with a respective code block; and means for transmitting the plurality of encoded code blocks in the plurality of slots on the PUSCH. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, e.g., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
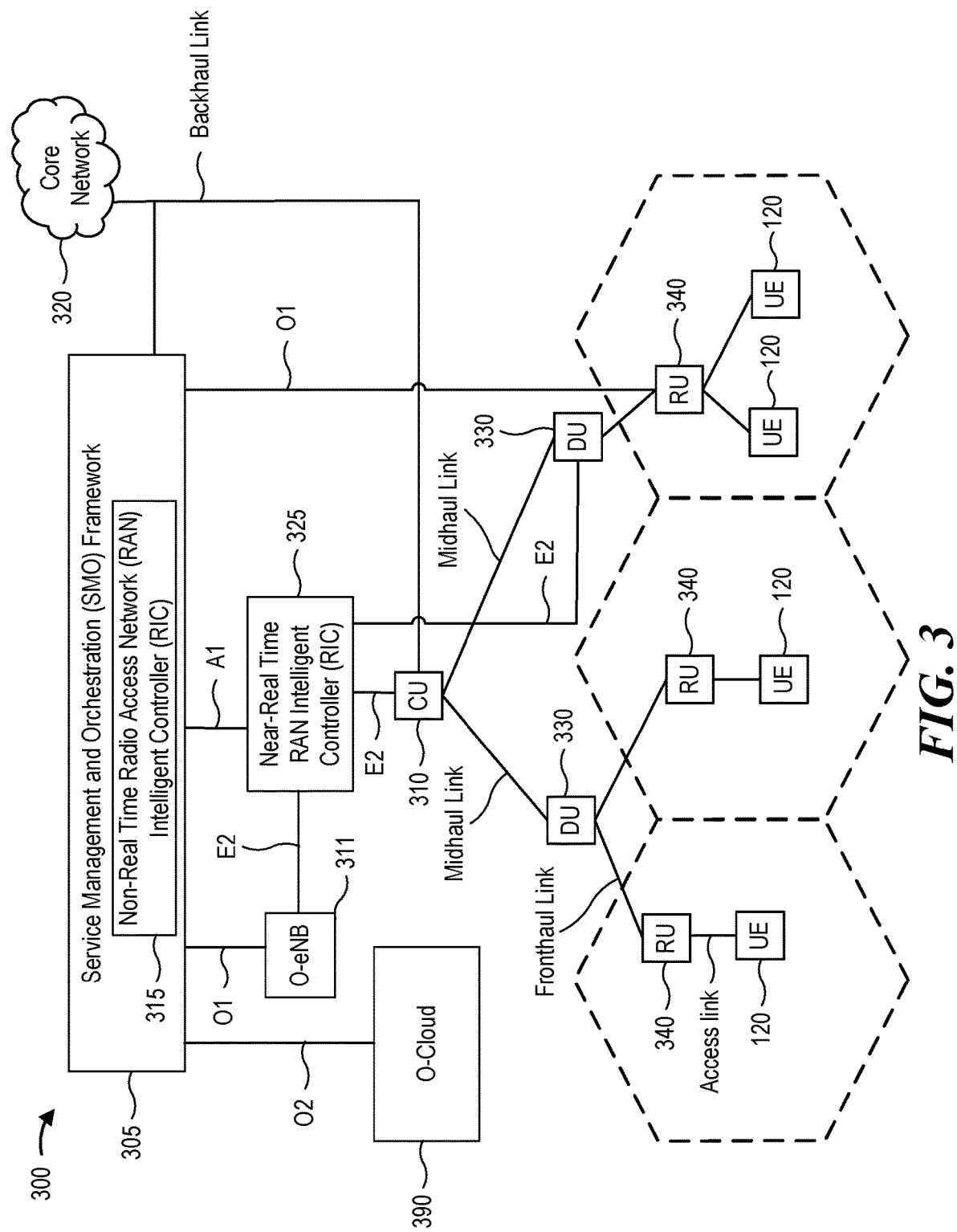
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit—user plane (CU-UP)), control plane functionality (e.g., central unit—control plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the Non-RT RIC 315 or the near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4A:
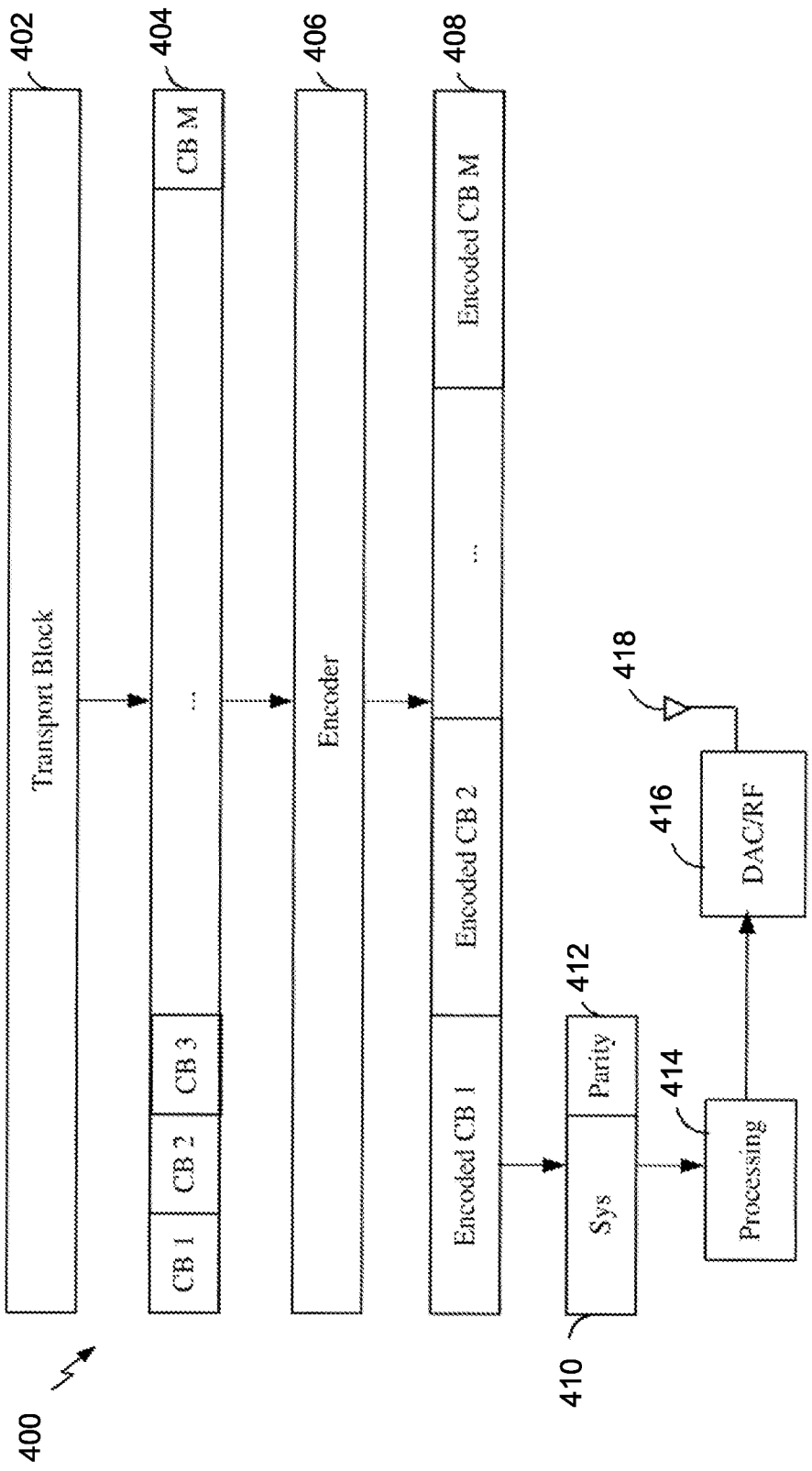
FIG. 4A is a block diagram illustrating an example of a transmitting wireless communication device configured to transmit a transport block.

FIG. 4A is a block diagram illustrating an example of transmitting wireless communication device 400 configured to transmit a transport block 402. The transmitting wireless communication device 400 may correspond to, for example, one of the UEs 120 described with reference to FIGS. 1 and 2.

The transport block 402 may include a packet, such as an Internet Protocol (IP) packet, a radio link control (RLC) protocol data unit (PDU), or a medium access control (MAC) PDU. The transmitting wireless communication device 400 may be configured to segment the transport block 402 into M code blocks (CBs) 404, each including information bits (e.g., systematic bits), that correspond to a portion of the packet.

Each of the code blocks 404 may then be encoded by a block encoder 406 to produce M encoded code blocks 408, each corresponding to a respective one of the code blocks 404. Each encoded code block 408 includes systematic (information) bits 410 and parity (redundancy) bits 412. For example, each of the code blocks 404 may have a length of K information bits 410. The block encoder 406 may then mathematically add redundancy (e.g., parity bits 412) to each code block 404, resulting in codewords or encoded code blocks 408, each having a length of N, where N>K. Here, the code rate R is the ratio between the code block length and the encoded code block length: R=K/N. Thus, with code blocks 404, the information bits 410 are transmitted together with the parity bits 412.

Further processing (e.g., modulation, tone mapping, etc.) may then be performed on the encoded code blocks 408 by a processing block 414 before being input to a digital-to-analog converter (DAC)/radio frequency (RF) block 416 for analog conversion and up-conversion of the analog signal to RF. The RF signal may then be transmitted via an antenna 418 (or antenna array).

In some conventional systems, the transport block 402 may be transmitted over resources (e.g., resource elements (REs)) reserved within a single slot for the transmission. In other examples, the transport block 402 may be transmitted across two or more slots. In such examples, segmentation may be applied at a transport block level or a code block level.

In some wireless systems, such as new radio (NR), the transport block may be segmented over multiple physical uplink shared channel (PUSCH) slots. In some such examples, the transport block size (TBS) may be determined based on the multiple slots. For rate matching of a transport block over multiple slots (TBoMS), bit interleaving may be performed for each slot. In other examples, bit interleaving may be performed over all the allocated slots for a single TBoMS.

As discussed, in some examples, the transport block may be mapped (e.g., segmented) to the multiple slots at one stage of a coding chain. The one stage may be before a channel coding stage, within each code block after a channel coding stage, or after a code block concatenation stage. An example of a process for coding data is provided in FIG. 4B, which shows a block diagram illustrating an example of a coding chain 450 for coding data for transmission in a wireless communication system.

Figure 4B:
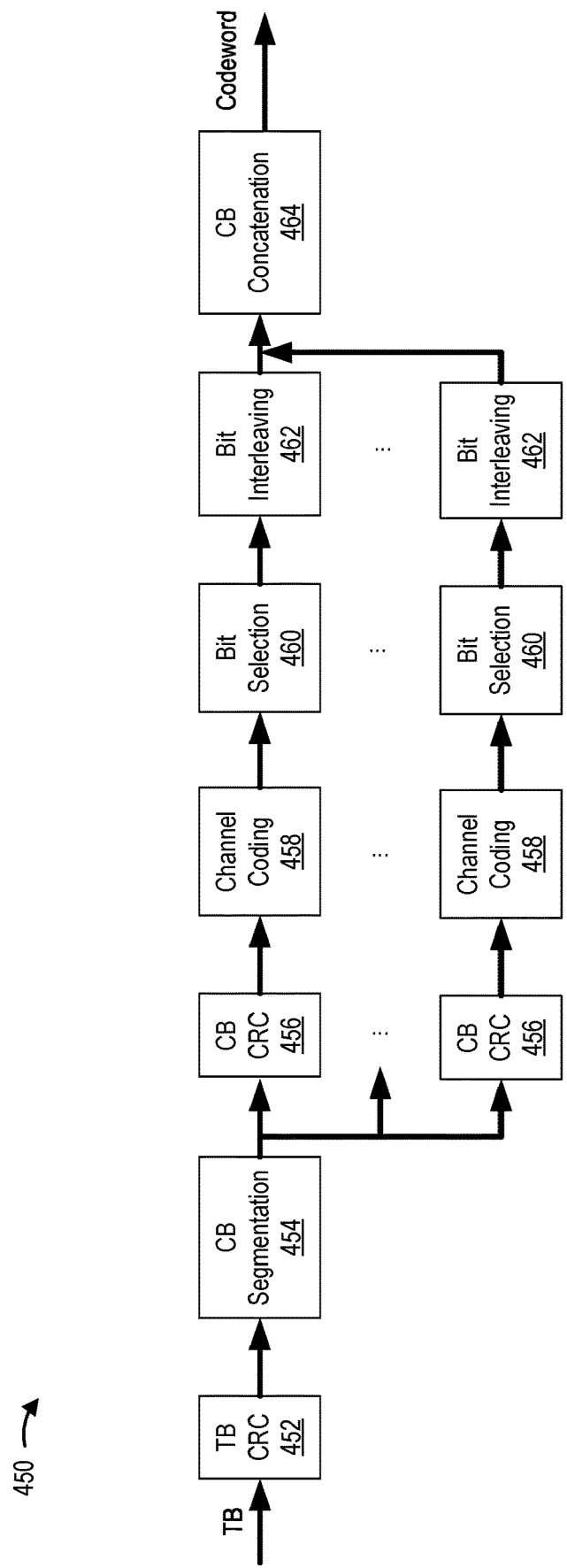
FIG. 4B is a block diagram illustrating an example of a coding chain that codes data for transmission in a wireless communication system.

In the example of FIG. 4B, the data may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station. In the example of FIG. 4B, the coding chain 450 may encode data that is processed as a transport block (TB), shown as "TB" in FIG. 4B. A TB cyclic redundancy check (CRC) module 452 may generate CRC parity bits for the transport block. The transport block with the CRC parity bits attached may be delivered to a code block (CB) segmentation module 454 that generates multiple code blocks. Each of the multiple code blocks may be processed by a distinct coding path. That is, the coding chain 450 may include one or more coding paths, where each of the one or more coding paths may be associated with a different code block. A CB CRC module 456 associated with each coding path may add CRC parity bits to the code block and each code block may be encoded by a channel coding module 458 to provide for error correction at a receiver. Additionally, a redundancy version (RV) may be added to each code block at a bit selection module 460 and the coded bits of each code block may be interleaved at a bit interleaving module 462. The multiple code blocks may be concatenated in a code block concatenation module 464. Finally, the concatenated code blocks may be scrambled at a scrambling unit (not shown) and the scrambled bits are modulated into complex symbols.

As discussed, various aspects of the disclosure relate to code block segmentation in a wireless communication network. In some examples, a wireless communication device, such as a user equipment (UE), may reserve resources, such as physical uplink shared channel (PUSCH) resources, on a carrier for transmission of a transport block. The reserved resources may span two or more consecutive or non-consecutive slots. The UE may segment (e.g., map) the transport block to the two or more slots. In some examples, the transport block may be segmented before a channel coding stage. In some other examples, the transport block may be segmented to multiple encoded code blocks. In such examples, the multiple encoded code blocks may be segmented to the two or more slots. In some other examples, the multiple encoded code blocks may be concatenated and the concatenated code blocks may be segmented to the two or more slots.

Figure 5A:
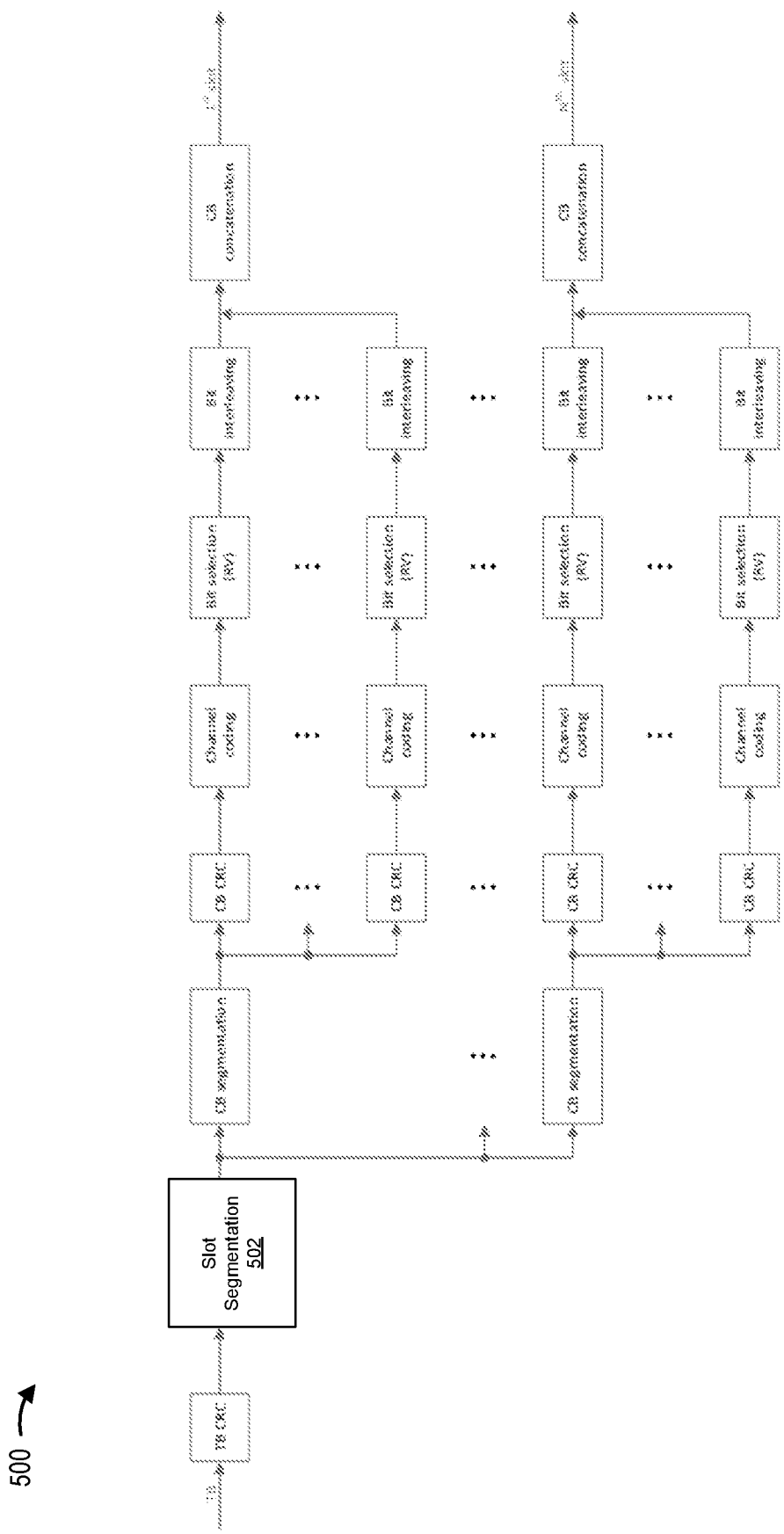
FIG. 5A is a block diagram illustrating an example of a coding chain for coding a segmented transport block for transmission in a wireless communication system, in accordance with various aspects of the present disclosure.

As discussed, in some implementations, the transport block may be segmented before a channel coding stage. An example of segmenting the transport block before the channel coding stage is shown in FIG. 5A, which is a block diagram illustrating an example of a coding chain 500 for coding a segmented transport block for transmission in a wireless communication system, in accordance with various aspects of the present disclosure. In the example of FIG. 5A, the coding chain 500 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

In the example of FIG. 5A, the coding chain 500 includes elements described with reference to the coding chain 450 described with reference to FIG. 4B. As shown in FIG. 5A, the coding chain 500 includes a slot segmentation module 502 before the CB segmentation module(s) 454. In some examples, the slot segmentation module 502 segments transport blocks (TB) based on a quantity of slots indicated by a network node, such as a base station. A TB size (subTB size) may be determined for each slot (1 to N). The subTB size may be based on a total transport block size (TBS) and a quantity of slots N, such that $$subTBS = 8\left\lceil \frac{TBS + 24}{8N} \right\rceil.$$

A subTBS for a single $$subTB = 8\left\lceil \frac{(TBS + 24) - (N-1)8\left\lceil \frac{TBS+24}{8N} \right\rceil}{8} \right\rceil.$$

The subTBS and/or the TBS may be determined at the TB cyclic redundancy check (CRC) module or prior to the TB CRC module. In the example of FIG. 5A, CB segmentation may be performed for each slot. That is, the TB segment of each slot may be further segmented into code blocks. Each CB segment of a slot may be processed via a separate coding path. Additionally, the CB concatenation may be performed for each slot and a scrambling sequence may be calculated for each slot.

Figure 5B:
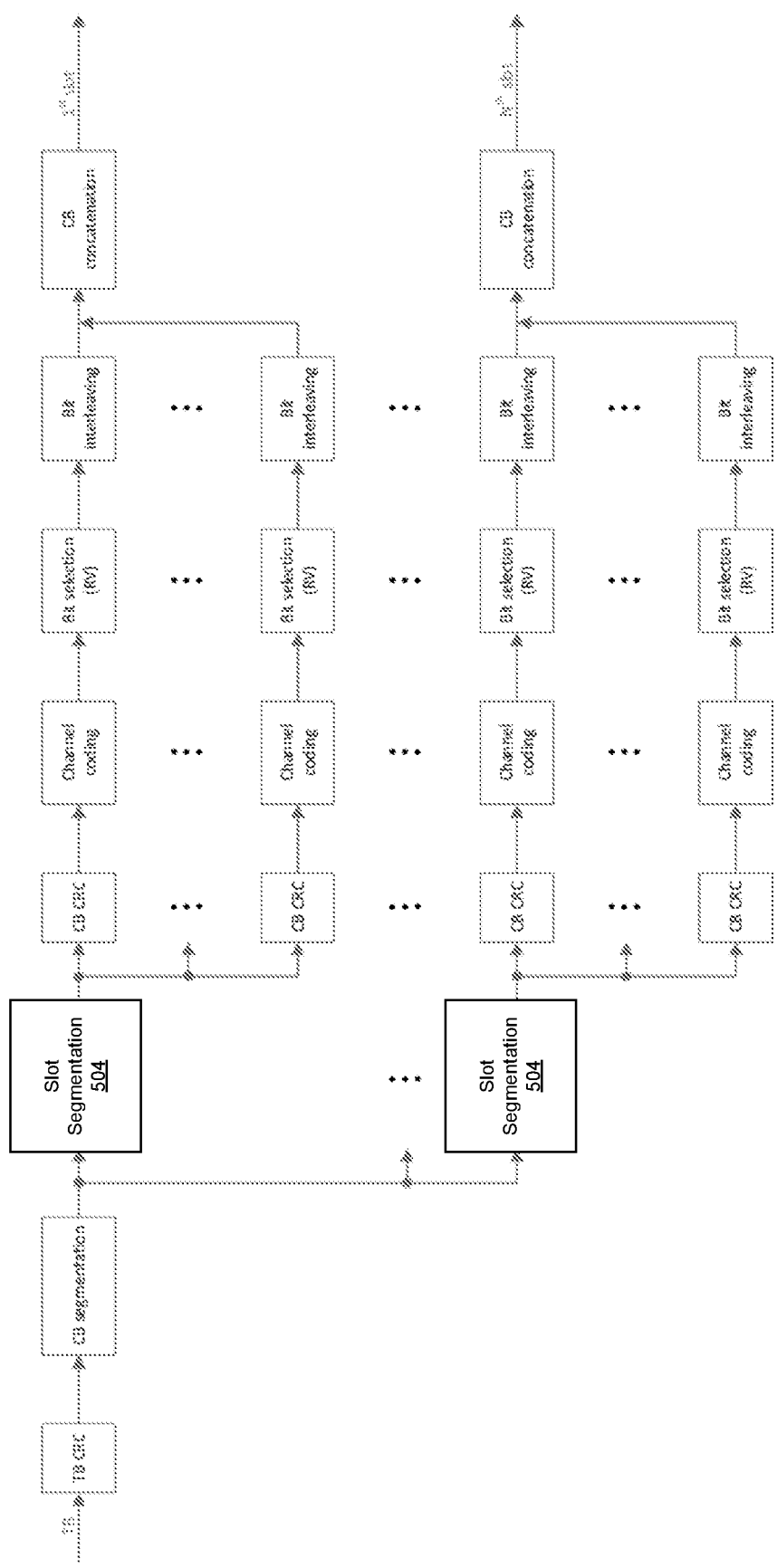
FIG. 5B is a block diagram illustrating an example of a coding chain for coding a segmented transport block for transmission in a wireless communication system, in accordance with various aspects of the present disclosure.

In some other implementations, the slots may be segmented after the transport block is segmented into multiple code blocks. An example of segmenting multiple code blocks is shown in FIG. 5B, which is a block diagram illustrating an example of a coding chain 530 that codes a segmented transport block for transmission in a wireless communication system, in accordance with various aspects of the present disclosure. In the example of FIG. 5B, the coding chain 530 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

In the example of FIG. 5B, the coding chain 550 includes elements described with reference to the coding chain 450 described with reference to FIG. 4B. As shown in the example of FIG. 5B, multiple slot segmentation modules 504 may be specified to perform slot segmentation after the CB segmentation module 454 segments the TB into multiple CB segments. In this example, each slot segmentation module 504 segments one or more CB segments generated by the CB segmentation module 454 to one of the multiple slots. As shown in FIG. 5B, each slot segmentation module 504 may receive the one or more CB segments and then allocate the quantity of CB segments to a corresponding slot. In some examples, the current implementation may be used when the quantity of CB segments is greater than or equal to the quantity of slot segments. In some examples, the CB concatenation may be performed for each slot. Additionally, the scrambling sequence can be calculated for each slot As an example, the quantity of slots may be four (N=4) and the quantity of CB segments may be six (C=6). In this example, one or two CB segments (subC) may be allocated per each slot. For the $i^{th}$ slot (i=0, . . . , N−1), the quantity of CB segments per slot (e.g., subC) may be based on a quantity of the slot i and a function of a quantity of slots N and the quantity of CB segments C. For example, $$subC = \left\lceil \frac{c}{N} \right\rceil,$$

if i<mod(C, N), $$subC = \left\lfloor \frac{c}{N} \right\rfloor,$$

if i>=mod(C, N), or $$subC = \left\lceil \frac{c}{N} \right\rceil \text{ or } \left\lfloor \frac{c}{N} \right\rfloor.$$

Figure 5C:
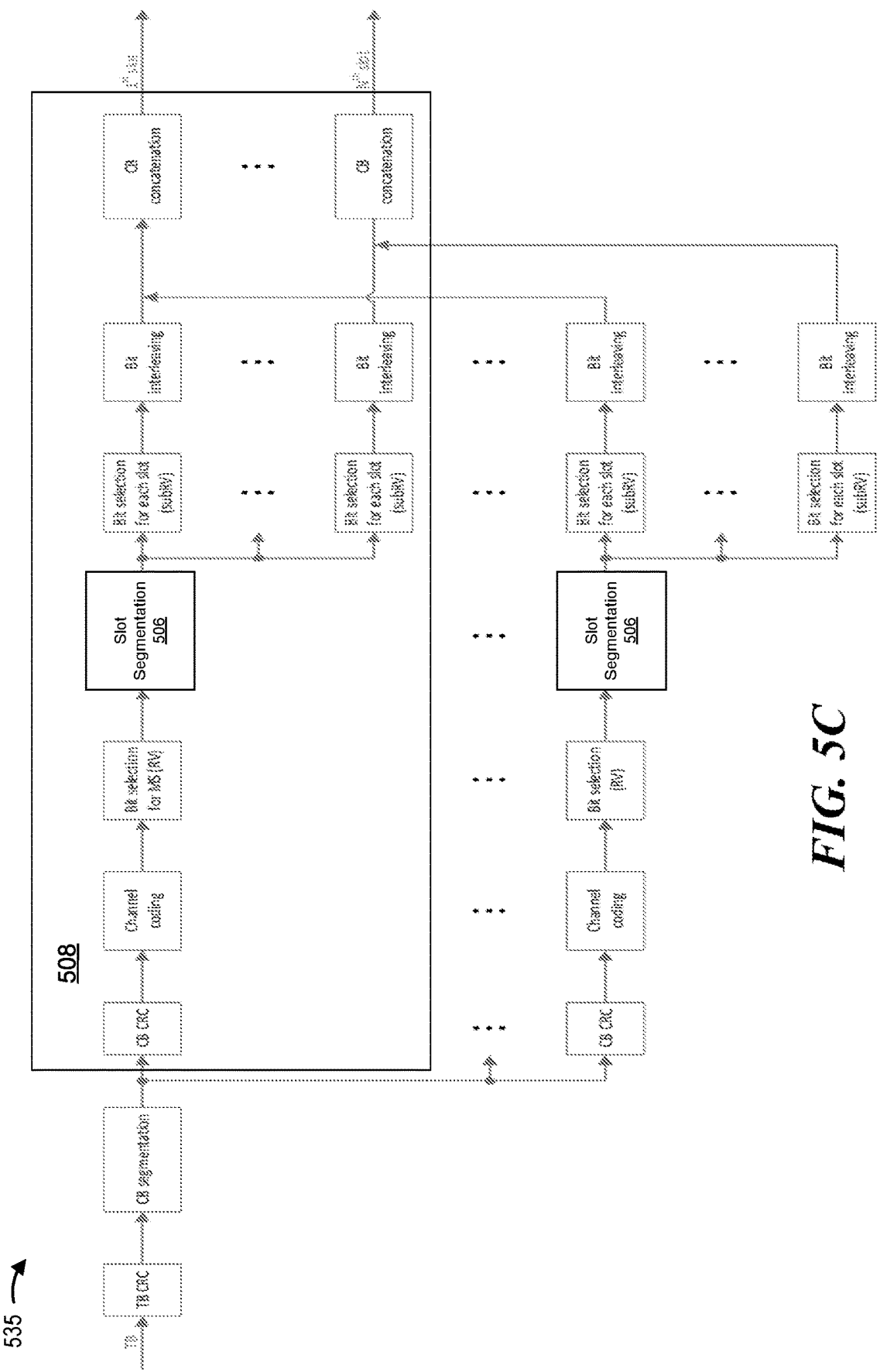
FIG. 5C is a block diagram illustrating an example of a coding chain for segmenting slots after coding code block (CB) segments, in accordance with various aspects of the present disclosure.

In some implementations, slot segmentation may be specified after each CB segment is coded. FIG. 5C is a block diagram illustrating an example of a coding chain 535 for segmenting slots after coding each CB segment, in accordance with various aspects of the present disclosure. In the example of FIG. 5C, the coding chain 535 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

In the example of FIG. 5C, the coding chain 535 includes elements described with reference to the coding chain 450, as described with reference to FIG. 4B. As shown in the example of FIG. 5C, the coding chain 535 includes a different coding path 508 for each CB segment. For ease of explanation, only one coding path 508 is indicated in FIG. 5C. In this example, a slot segmentation module 506 performs slot segmentation at the coding path 508 associated with each CB segment. That is, in each coding path 508, a bit sequence may be segmented into sub-redundancy versions (RVs) (subRVs) for each slot (1 to N). A quantity of bits per slot may be determined based on one or more parameters, such as a rate matching parameter. A start bit for each slot may be determined based on a pre-defined rule, such as a rule based on rate matching. Each subRV may have a same or different start bit in each designated slot. As shown in FIG. 5C, multiple subRVs may be generated for each CB segment (subCB). In some examples, subRVs from different subCBs may be combined based on corresponding slots. For example, the first subRV of each subCB may be combined at the first slot and the Nth subRV of each subCB may be combined at the Nth slot. In the example of FIG. 5C, bit interleaving may be performed on each subRV before corresponding subRVs are concatenated. In some other examples, bit interleaving may be performed after corresponding subRVs are combined (e.g., concatenated).

Figure 5D:
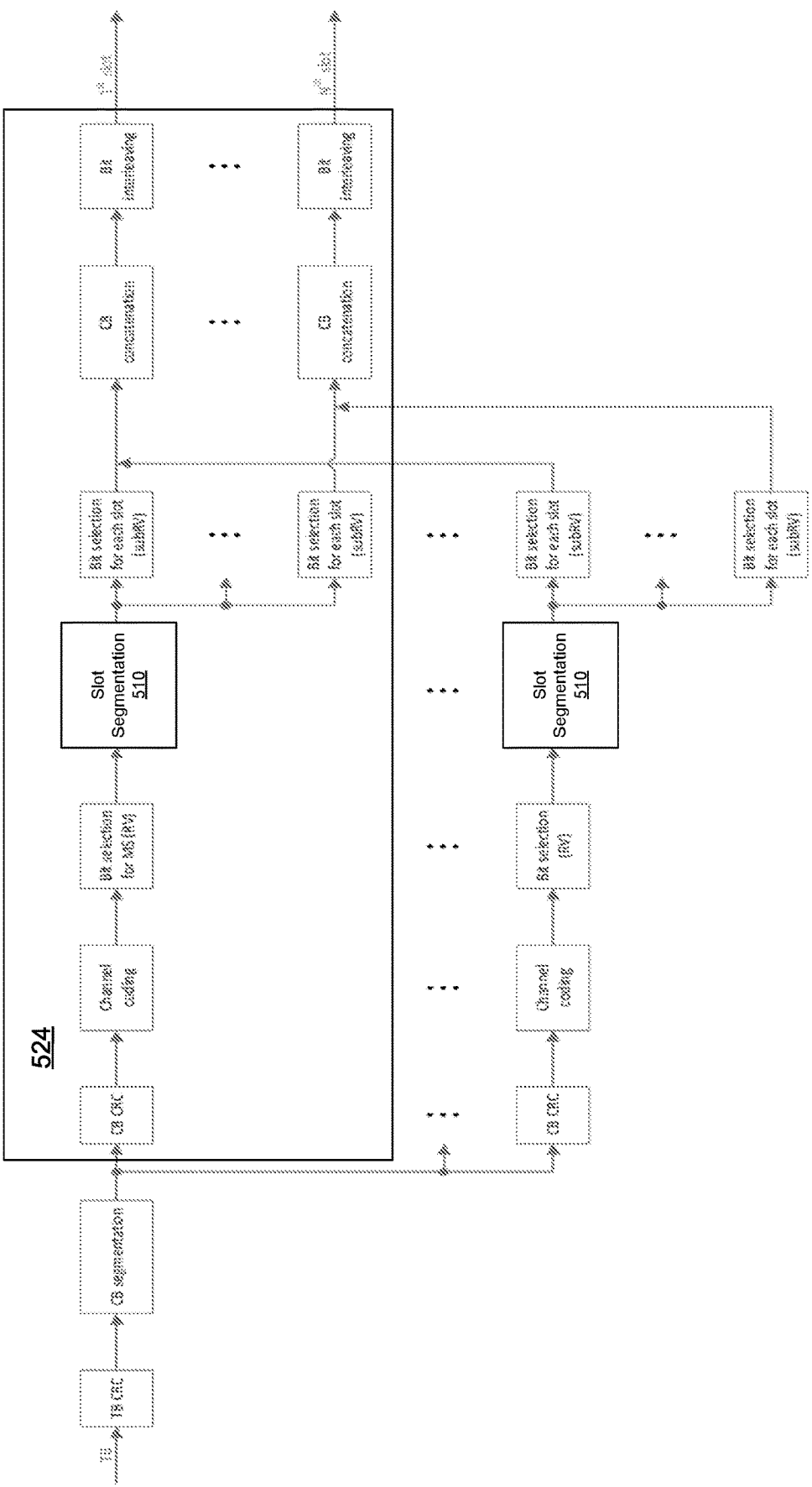
FIG. 5D is a block diagram illustrating an example of a coding chain that performs bit interleaving after combining segmented bit sequences, in accordance with various aspects of the present disclosure.

FIG. 5D is a block diagram illustrating an example of a coding chain 540 that performs bit interleaving after combining segmented bit sequences (e.g., subRVs), in accordance with various aspects of the present disclosure. In the example of FIG. 5D, the coding chain 540 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

In the example of FIG. 5D, the coding chain 540 includes elements described with reference to the coding chain 450, as described with reference to FIG. 4B. As shown in the example of FIG. 5D, the coding chain 540 includes a different coding path 524 for each CB segment. For ease of explanation, only one coding path 524 is indicated in FIG. 5D. In this example, a slot segmentation module 510 performs slot segmentation at the coding path 524 associated with each CB segment. That is, in each coding path 524, a bit sequence may be segmented into subRVs for each slot (1 to N). A quantity of bits per slot may be determined based on one or more parameters, such as a rate matching parameter. A start bit for each slot may be determined based on a pre-defined rule, such as a rule based on rate matching. Each subRV may have a same or different start bit in each designated slot. As shown in FIG. 5D, multiple subRVs may be generated for each CB segment (subCB). In some examples, subRVs from different subCBs may be combined based on corresponding slots. For example, the first subRV of each subCB may be combined at the first slot and the Nth subRV of each subCB may be combined at the Nth slot.

As discussed, in the example of FIG. 5D, a bit interleaving module 462 is defined after each CB concatenation module 464. That is, the bit interleaving may be performed per slot. In such examples, per slot bit interleaving may increase channel robustness. The bit interleaving may be performed as follows:

$$\begin{aligned} &\text{for } j = 0 \text{ to } E/Q_m - 1 \\ &\quad \text{for } i = 0 \text{ to } Q_m - 1 \\ &\quad\quad f_{i+j \cdot Q_m} = e_{i \cdot E/Q_m + j} \\ &\quad \text{end for} \\ &\text{end for} \end{aligned} \quad (1)$$

In Equation 1, the parameter $Q_m$ defines a modulation order. In some aspects, $Q_m$ may be configured by the network or be a pre-defined value based on one or more factors, such as a quantity of slots, a quantity of subCBs, or a quantity of subRVs.

Figure 5E:
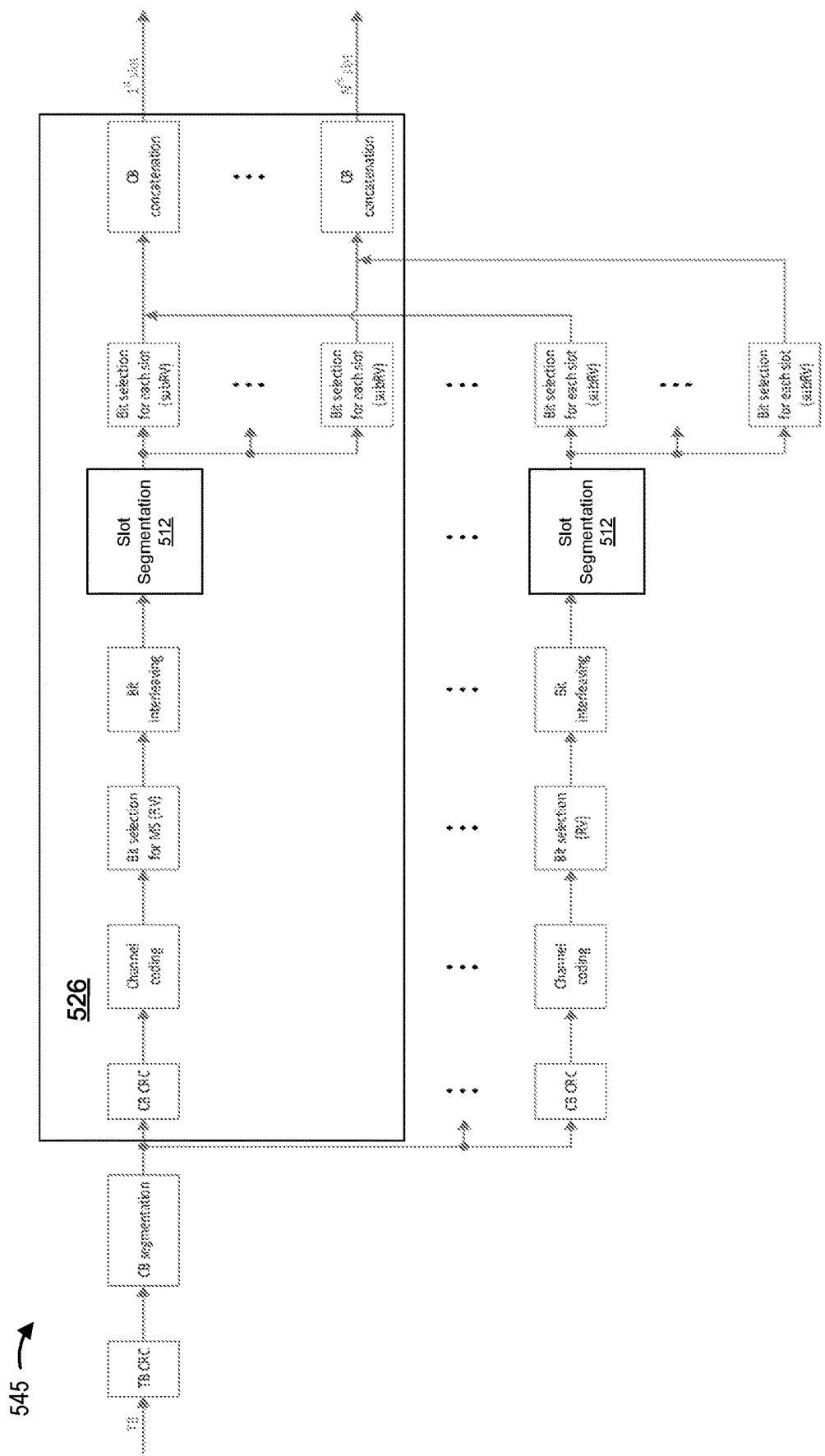
FIG. 5E is a block diagram illustrating an example of a coding chain that performs slot segmentation after performing a bit interleaving operation on each CB segment, in accordance with various aspects of the present disclosure.

In some implementations, the slot segmentation is performed after a bit interleaving operation on each CB segment. FIG. 5E is a block diagram illustrating an example of a coding chain 545 that performs slot segmentation after performing a bit interleaving operation on each CB segment, in accordance with various aspects of the present disclosure. In the example of FIG. 5E, the coding chain 545 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

In the example of FIG. 5E, the coding chain 545 includes elements described with reference to the coding chain 450, as described with reference to FIG. 4B. As shown in the example of FIG. 5E, the coding chain 545 includes a different coding path 526 for each CB segment. For ease of explanation, only one coding path 526 is indicated in FIG. 5E. In this example, a slot segmentation module 512 performs slot segmentation at each coding path 526. That is, in the example of FIG. 5E, the interleaved bit sequence may be segmented into subRVs for each slot (1 to N). A quantity of bits per slot may be determined based on one or more parameters, such as a rate matching parameter. A start bit for each slot may be determined based on a pre-defined rule, such as a pre-defined rule based on rate matching. Each subRV may have a same or different start bit in each designated slot. As shown in FIG. 5E, multiple subRVs may be generated for each CB segment (subCB). In some examples, subRVs from different subCBs may be combined based on corresponding slots. For example, the first subRV of each subCB may be combined at the first slot and the Nth tsubRV of each subCB may be combined at the Nth slot.

Figure 5F:
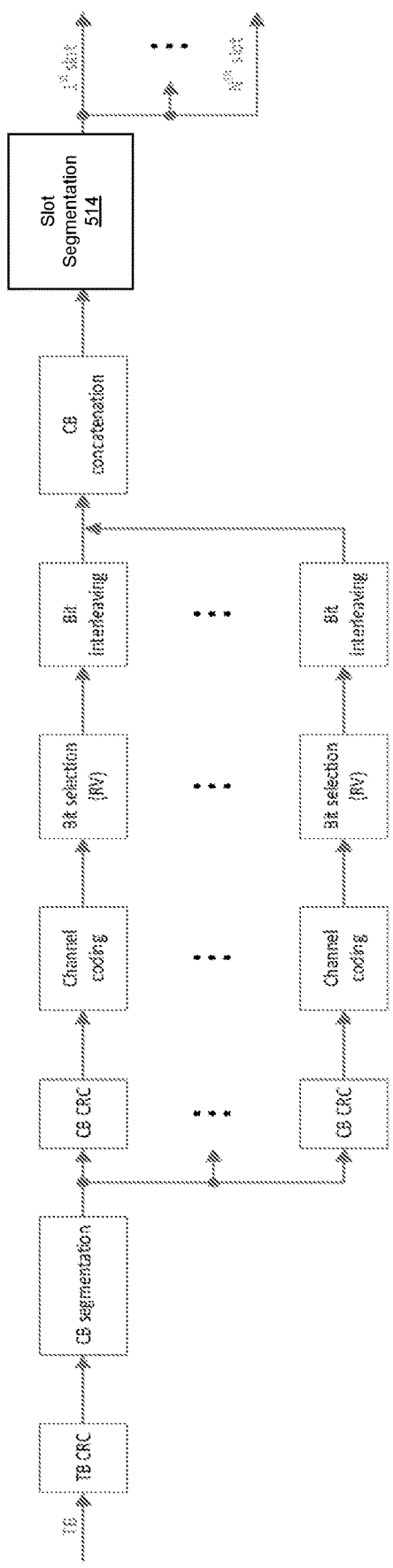
FIG. 5F is a block diagram illustrating an example of a coding chain that performs slot segmentation after performing a bit interleaving operation on each CB segment, in accordance with various aspects of the present disclosure.

In some implementations, the slot segmentation is specified after a CB concatenation module. FIG. 5F is a block diagram illustrating an example of a coding chain 550 that performs slot segmentation after performing a bit interleaving operation on each CB segment, in accordance with various aspects of the present disclosure. In the example of FIG. 5F, the coding chain 550 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

In the example of FIG. 5F, the coding chain 550 includes elements described with reference to the coding chain 450, as described with reference to FIG. 4B. As shown in FIG. 5F, a slot segmentation module 514 receives an output of a CB concatenation module 464. In this example, rate matching parameters may identify a quantity of bits used per CB across all slots. A start bit for each slot may be determined based on a pre-defined rule, such as a pre-defined rule based on rate matching. In some examples, for physical uplink shared channel (PUSCH) scrambling, a scrambling sequence may be determined for each slot. In some other examples, the same scrambling sequence may be calculated for all slots, and a different start bit may be used for each slot. The start bit may be based on a slot segmentation calculation result.

Figure 5G:
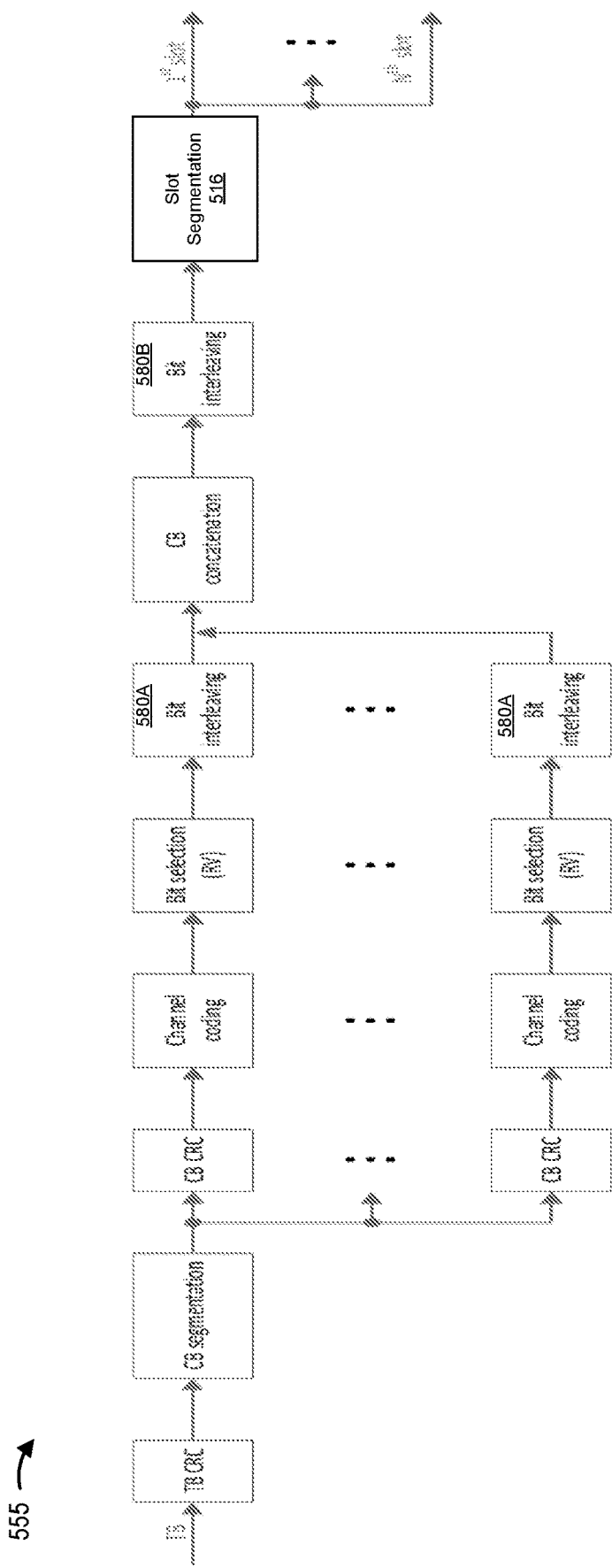
FIGS. 5G and 5H are block diagrams illustrating examples of coding chains that perform slot segmentation after performing a bit interleaving operation on concatenated CB segments, in accordance with various aspects of the present disclosure.

In some other implementations, the slot segmentation is specified after a CB concatenation module and a bit interleaving module may be defined between the CB concatenation module and the slot segmentation module. FIG. 5G is a block diagram illustrating an example of a coding chain 555 that performs slot segmentation after performing a bit interleaving operation on concatenated CB segments, in accordance with various aspects of the present disclosure. In the example of FIG. 5G, the coding chain 555 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

As shown in the example of FIG. 5G, a bit interleaving module 580B may be defined between the CB concatenation module 464 and a slot segmentation module 516. In this example, the bit interleaving may be performed after CB concatenation for an entire transport block across all the slots. As shown in FIG. 5G, another bit interleaving module 580A may also be specified in a coding chain of each subCB. As discussed, the modulation order $Q_m$ may be configured by the network or be a pre-defined value based on one or more factors, such as a quantity of slots, a quantity of subCBs, or a quantity of subRVs. A start bit for each slot may be determined based on a pre-defined rule, such as a pre-defined rule based on rate matching. In some examples, for PUSCH scrambling, a scrambling sequence may be determined for each slot. In some other examples, the same scrambling sequence may be calculated for all slots, and a different start bit may be used for each slot. The start bit may be based on a slot segmentation calculation result. The bit interleaving modules 580A and 580B may be the same as the bit interleaving module 462 described with reference to FIG. 4B.

Figure 5H:
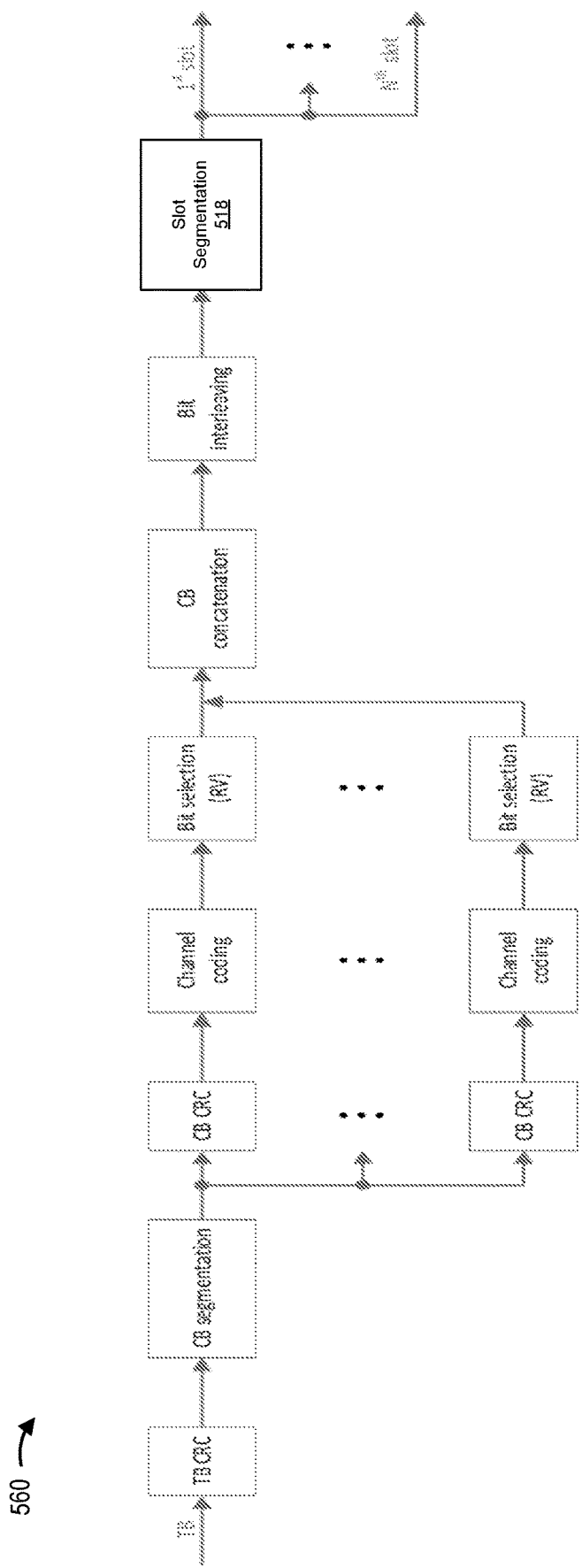

FIG. 5H is a block diagram illustrating another example of a coding chain 560 that performs slot segmentation after performing a bit interleaving operation on concatenated CB segments, in accordance with various aspects of the present disclosure. In the example of FIG. 5H, the coding chain 560 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

As shown in the example of FIG. 5H, a bit interleaving module 462 may be defined between the CB concatenation module 464 and a slot segmentation module 518. In this example, the bit interleaving may be performed after CB concatenation for an entire transport block across all the slots. As shown in FIG. 5H, a bit interleaving module is omitted from a coding chain of each subCB. As discussed, the modulation order $Q_m$ may be configured by the network or may be a pre-defined value based on one or more factors, such as a quantity of slots, a quantity of subCBs, or a quantity of subRVs. A start bit for each slot may be determined based on a pre-defined rule, such as a pre-defined rule based on rate matching. In some examples, for PUSCH scrambling, a scrambling sequence may be determined for each slot. In some other examples, the same scrambling sequence may be calculated for all slots, and a different start bit may be used for each slot. The start bit may be based on a slot segmentation calculation result.

Figure 5I:
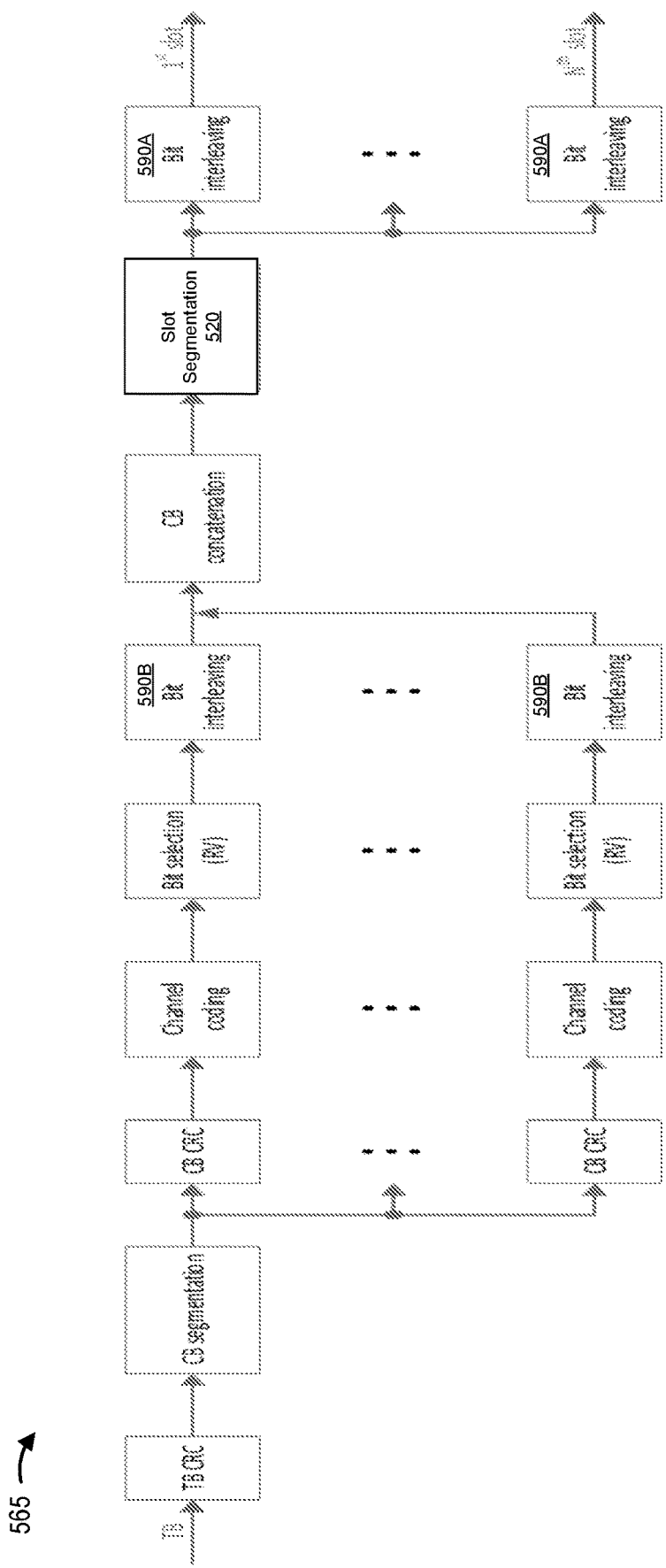
FIGS. 5I and 5J are block diagrams illustrating examples of coding chains that perform a bit interleaving operation after performing a slot segmentation operation on concatenated CB segments, in accordance with various aspects of the present disclosure.

In some implementations, the slot segmentation is specified after a CB concatenation module and a bit interleaving module may be defined after the slot segmentation module. FIG. 5I is a block diagram illustrating an example of a coding chain 565 that performs a bit interleaving operation after performing a slot segmentation operation on concatenated CB segments, in accordance with various aspects of the present disclosure. In the example of FIG. 5I, the coding chain 565 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

As shown in the example of FIG. 5I, multiple bit interleaving modules 590A may be defined after a slot segmentation module 520, such that the bit interleaving may be performed for each slot. As shown in FIG. 5I, second bit interleaving module 590B may also be specified in a coding chain of each subCB. In this example, the bit interleaving may be performed after CB concatenation for an entire transport block across all the slots. In the example of FIG. 5I, the modulation order $Q_m$ may be configured by the network or may be a pre-defined value based on one or more factors, such as a quantity of slots, a quantity of subCBs, or a quantity of subRVs. A start bit for each slot may be determined based on a pre-defined rule, such as a pre-defined rule based on rate matching. In some examples, for PUSCH scrambling, a scrambling sequence may be determined for each slot. In some other examples, the same scrambling sequence may be calculated for all slots, and a different start bit may be used for each slot. The start bit may be based on a slot segmentation calculation result. The bit interleaving modules 590A and 590B may be the same as the bit interleaving module 462 described with reference to FIG. 4B.

Figure 5J:
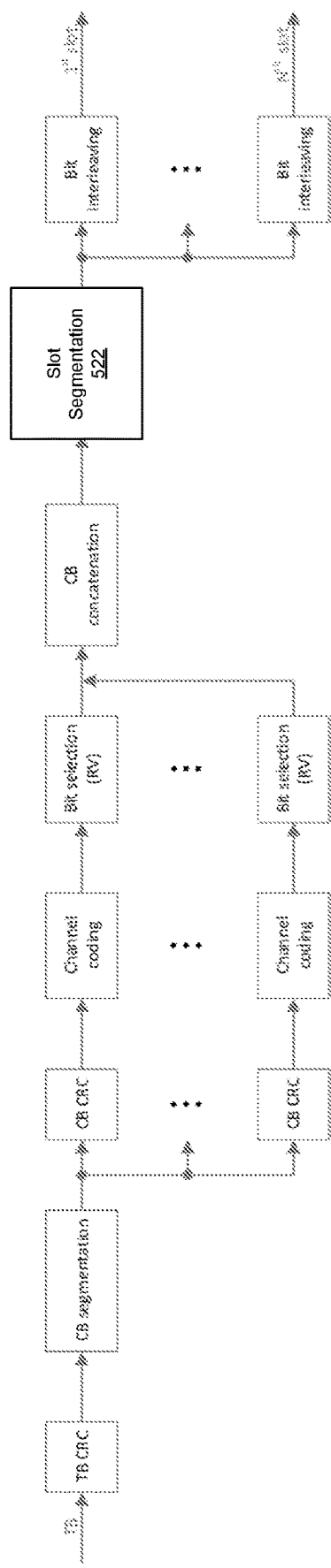

FIG. 5J is a block diagram illustrating another example of a coding chain 570 that performs a bit interleaving operation after performing a slot segmentation operation on concatenated CB segments, in accordance with various aspects of the present disclosure. In the example of FIG. 5J, the coding chain 570 may encode data that may be transmitted between a base station and a UE. The base station may be an example of a base station 110 as described with reference to FIGS. 1 and 2, or an RU 340, DU 330, or CU 310 as described with reference to FIG. 3. Furthermore, the UE may be an example of a UE 120 as described with reference to FIGS. 1, 2, and 3. In aspects of the present disclosure, the data is uplink data transmitted by the UE to a receiving device, such as a base station.

As shown in the example of FIG. 5J, multiple bit interleaving modules 462 may be defined after a slot segmentation module 522, such that the bit interleaving may be performed for each slot. As shown in FIG. 5J, a bit interleaving module is omitted from a coding chain of each subCB. Additionally, in the example of FIG. 5J, the modulation order $Q_m$ may be configured by the network or may be a pre-defined value based on one or more factors, such as a quantity of slots, a quantity of subCBs, or a quantity of subRVs. A start bit for each slot may be determined based on a pre-defined rule, such as a pre-defined rule based on rate matching. In some examples, for PUSCH scrambling, a scrambling sequence may be determined for each slot. In some other examples, the same scrambling sequence may be calculated for all slots, and a different start bit may be used for each slot. The start bit may be based on a slot segmentation calculation result.

Figure 6:
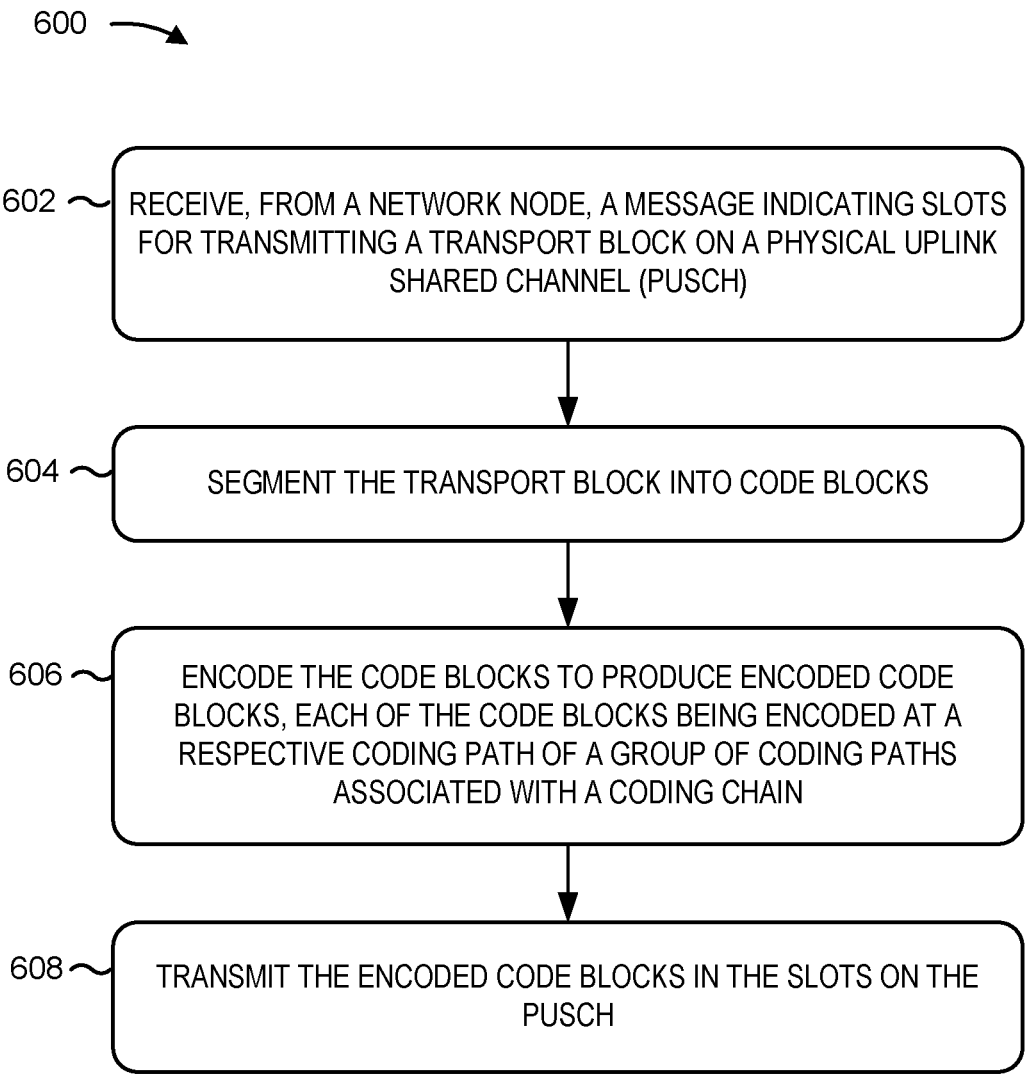
FIG. 6 is a flow diagram illustrating an example process performed, for example, by a UE, in accordance with various aspects of the present disclosure.

FIG. 6 is a flow diagram illustrating an example process 600 performed, for example, by a user equipment (UE), in accordance with various aspects of the present disclosure. The example process 600 is an example of segmenting a transport block over multiple consecutive or non-consecutive slots. As shown in FIG. 6, at block 602 the process 600 receives, from a base station, a message indicating multiple slots for transmitting a transport block on a physical uplink shared channel (PUSCH). At block 604, the process 600 segments the transport block into multiple code blocks. In some implementations, the UE segments the transport block into the multiple code blocks by segmenting the transport block into a multiple sub-transport blocks based on a quantity of the multiple slots. Each slot of the multiple slots corresponds to a set of sub-transport blocks of the multiple sub-transport blocks. Additionally, the UE may segment the multiple sub-transport blocks into the multiple code blocks. In other implementations, the UE segments the multiple code blocks based on a quantity of the multiple slots, such that each slot is associated with one or more different code blocks of the multiple code blocks. In still other implementations, the UE segments a bit sequence of each code block of the multiple code blocks at the coding chain associated with the code block based on a quantity of the multiple slots. Additionally, the UE may concatenate, at a concatenation stage associated with each slot of the plurality of slots, multiple bit sequence segments to generate the concatenated multiple bit sequence segments of each slot, each bit sequence segment of the multiple bit sequence segments corresponds to a different code block. In other implementations, the UE may concatenate the multiple encoded code blocks to generate a concatenated encoded code block and segment the concatenated encoded code block based on a quantity of the multiple slots.

At block 606, the process 600 encodes the multiple code blocks to produce multiple encoded code blocks. Each of the multiple code blocks encoded at a coding chain may be associated with a respective code block. At block 608, the process 600 transmits the multiple encoded code blocks in the multiple slots on the PUSCH.

Implementation examples are described in the following numbered clauses.

1. A method of wireless communication at a user equipment (UE), comprising: receiving, from a base station, a message indicating a plurality of slots for transmitting a transport block on a physical uplink shared channel (PUSCH); segmenting the transport block into a plurality of code blocks; encoding the plurality of code blocks to produce a plurality of encoded code blocks, each of the plurality of code blocks encoded at a respective coding path of a plurality of coding paths associated with a coding chain; and transmitting the plurality of encoded code blocks in the plurality of slots on the PUSCH.

2. The method of Clause 1, in which segmenting the transport block into the plurality of code blocks comprises: segmenting the transport block into a plurality of sub-transport blocks based on a quantity of the plurality of slots, each slot of the plurality of slots corresponding to a set of sub-transport blocks of the plurality of sub-transport blocks; and segmenting the plurality of sub-transport blocks into the plurality of code blocks.

3. The method of Clause 2, in which a size of each sub-transport block may be based on the quantity of the plurality of slots.

4. The method of Clause 1, further comprising segmenting the plurality of code blocks based on a quantity of the plurality of slots, such that each slot is associated with one or more different code blocks of the plurality of code blocks.

5. The method of Clause 4, in which the quantity of the plurality of code blocks is greater than the quantity of the plurality of slots.

6. The method of Clause 1, further comprising: segmenting a bit sequence of each code block of the plurality of code blocks at the coding chain associated with the code block based on a quantity of the plurality of slots; and concatenating, at a concatenation stage associated with each slot of the plurality of slots, a plurality of bit sequence segments to generate the concatenated plurality of bit sequence segments of each slot, each bit sequence segment of the plurality of bit sequence segments corresponding to a different code block.

7. The method of Clause 6, further comprising bit interleaving each bit sequence segment prior to concatenating the plurality of bit sequence segments.

8. The method of Clause 6, further comprising bit interleaving the concatenated plurality of bit sequence segments of each slot.

9. The method of Clause 6, further comprising bit interleaving the bit sequence of each code block prior to segmenting the bit sequence of each code block.

10. The method of Clause 1, further comprising: concatenating the plurality of encoded code blocks to generate a concatenated encoded code block; and segmenting the concatenated encoded code block based on a quantity of the plurality of slots.

11. The method of Clause 10, further comprising scrambling each slot of the plurality of slots based on a different scrambling sequence.

12. The method of Clause 10, further comprising scrambling the plurality of slots based on a single scrambling sequence.

13. The method of Clause 10, further comprising bit interleaving the plurality of encoded code blocks prior to segmenting the concatenated encoded code block.

14. The method of Clause 13, further comprising bit interleaving each code block prior to concatenating the plurality of encoded code blocks.

15. The method of Clause 10, further comprising bit interleaving each segment of the concatenated encoded code block.

16. The method of Clause 13, further comprising bit interleaving each code block prior to concatenating the plurality of encoded code blocks.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication at a user equipment (UE), comprising:
    receiving, from a network node, a message indicating a plurality of slots for transmitting a transport block on a physical uplink shared channel (PUSCH);
    segmenting the transport block into a plurality of code blocks;
    encoding the plurality of code blocks to produce a plurality of encoded code blocks, each of the plurality of code blocks encoded at a respective coding path of a plurality of coding paths associated with a coding chain;
    transmitting the plurality of encoded code blocks in the plurality of slots on the PUSCH; and
    concatenating the plurality of encoded code blocks to generate a concatenated encoded code block; and segmenting the concatenated encoded code block based on a quantity of the plurality of slots.

2. The method of claim 1, in which segmenting the transport block into the plurality of code blocks comprises:
    segmenting the transport block into a plurality of sub-transport blocks based on a quantity of the plurality of slots, each slot of the plurality of slots corresponding to a set of sub-transport blocks of the plurality of sub-transport blocks; and segmenting the plurality of sub-transport blocks into the plurality of code blocks.

3. The method of claim 2, in which a size of each sub-transport block may be based on the quantity of the plurality of slots.

4. The method of claim 1, further comprising segmenting the plurality of code blocks based on a quantity of the plurality of slots, such that each slot is associated with one or more different code blocks of the plurality of code blocks.

5. The method of claim 4, in which the quantity of the plurality of code blocks is greater than the quantity of the plurality of slots.

6. The method of claim 1, further comprising:
segmenting a bit sequence of each code block of the plurality of code blocks at the coding chain associated with the code block based on a quantity of the plurality of slots; and
concatenating, at a concatenation stage associated with each slot of the plurality of slots, a plurality of bit sequence segments to generate the concatenated plurality of bit sequence segments of each slot, each bit sequence segment of the plurality of bit sequence segments corresponding to a different code block.

7. The method of claim 6, further comprising bit interleaving each bit sequence segment prior to concatenating the plurality of bit sequence segments.

8. The method of claim 6, further comprising bit interleaving the concatenated plurality of bit sequence segments of each slot.

9. The method of claim 6, further comprising bit interleaving the bit sequence of each code block prior to segmenting the bit sequence of each code block.

10. The method of claim 1, further comprising scrambling each slot of the plurality of slots based on a different scrambling sequence.

11. The method of claim 1, further comprising scrambling the plurality of slots based on a single scrambling sequence.

12. The method of claim 1, further comprising bit interleaving the plurality of encoded code blocks prior to segmenting the concatenated encoded code block.

13. The method of claim 12, further comprising bit interleaving each code block prior to concatenating the plurality of encoded code blocks.

14. The method of claim 1, further comprising bit interleaving each segment of the concatenated encoded code block.

15. The method of claim 12, further comprising bit interleaving each code block prior to concatenating the plurality of encoded code blocks.

16. An apparatus for wireless communications at a user equipment (UE), comprising:
means for receiving, from a network node, a message indicating a plurality of slots for transmitting a transport block on a physical uplink shared channel (PUSCH);
means for segmenting the transport block into a plurality of code blocks;
means for encoding the plurality of code blocks to produce a plurality of encoded code blocks, each of the plurality of code blocks encoded at a respective coding path of a plurality of coding paths associated with a coding chain;
means for transmitting the plurality of encoded code blocks in the plurality of slots on the PUSCH;
means for concatenating the plurality of encoded code blocks to generate a concatenated encoded code block; and
means for segmenting the concatenated encoded code block based on a quantity of the plurality of slots.

17. The apparatus of claim 16, in which the means for segmenting the transport block into the plurality of code blocks further comprises:
means for segmenting the transport block into a plurality of sub-transport blocks based on a quantity of the plurality of slots, each slot of the plurality of slots corresponding to a set of sub-transport blocks of the plurality of sub-transport blocks; and
means for segmenting the plurality of sub-transport blocks into the plurality of code blocks.

18. The apparatus of claim 16, further comprising means for segmenting the plurality of code blocks based on a quantity of the plurality of slots, such that each slot is associated with one or more different code blocks of the plurality of code blocks.

19. The apparatus of claim 16, further comprising:
means for segmenting a bit sequence of each code block of the plurality of code blocks at the coding chain associated with the code block based on a quantity of the plurality of slots; and
means for concatenating, at a concatenation stage associated with each slot of the plurality of slots, a plurality of bit sequence segments to generate the concatenated plurality of bit sequence segments of each slot, each bit sequence segment of the plurality of bit sequence segments corresponding to a different code block.

20. An apparatus for wireless communications at a user equipment (UE), comprising:
a processor; and
a memory coupled with the processor and storing instructions operable, when executed by the processor, to cause the apparatus to:
receive, from a network node, a message indicating a plurality of slots for transmitting a transport block on a physical uplink shared channel (PUSCH);
segment the transport block into a plurality of code blocks;
encode the plurality of code blocks to produce a plurality of encoded code blocks, each of the plurality of code blocks encoded at a respective coding path of a plurality of coding paths associated with a coding chain;
transmit the plurality of encoded code blocks in the plurality of slots on the PUSCH;
concatenate the plurality of encoded code blocks to generate a concatenated encoded code block; and
segment the concatenated encoded code block based on a quantity of the plurality of slots.

21. The apparatus of claim 20, in which execution of the instructions that cause the apparatus to segment the transport block into the plurality of code blocks further cause the apparatus to:
segment the transport block into a plurality of sub-transport blocks based on a quantity of the plurality of slots, each slot of the plurality of slots corresponding to a set of sub-transport blocks of the plurality of sub-transport blocks; and
segment the plurality of sub-transport blocks into the plurality of code blocks.

22. The apparatus of claim 20, in which execution of the instructions further cause the apparatus to segment the plurality of code blocks based on a quantity of the plurality of slots, such that each slot is associated with one or more different code blocks of the plurality of code blocks.

23. The apparatus of claim 20, in which execution of the instructions further cause the apparatus to:
- segment a bit sequence of each code block of the plurality of code blocks at the coding chain associated with the code block based on a quantity of the plurality of slots; and
- concatenate, at a concatenation stage associated with each slot of the plurality of slots, a plurality of bit sequence segments to generate the concatenated plurality of bit sequence segments of each slot, each bit sequence segment of the plurality of bit sequence segments corresponding to a different code block.

24. A non-transitory computer-readable medium having program code recorded thereon for wireless communication at a user equipment (UE), the program code executed by a processor and comprising:
- program code to receive, from a network node, a message indicating a plurality of slots for transmitting a transport block on a physical uplink shared channel (PUSCH);
- program code to segment the transport block into a plurality of code blocks;
- program code to encode the plurality of code blocks to produce a plurality of encoded code blocks, each of the plurality of code blocks encoded at a respective coding path of a plurality of coding paths associated with a coding chain;
- program code to transmit the plurality of encoded code blocks in the plurality of slots on the PUSCH; and
- program code to segment a bit sequence of each code block of the plurality of code blocks at the coding chain associated with the code block based on a quantity of the plurality of slots; and
- program code to concatenate, at a concatenation stage associated with each slot of the plurality of slots, a plurality of bit sequence segments to generate the concatenated plurality of bit sequence segments of each slot, each bit sequence segment of the plurality of bit sequence segments corresponding to a different code block.

25. The non-transitory computer-readable medium of claim 24, in which the program code to segment the transport block into the plurality of code blocks further comprises:
- program code to segment the transport block into a plurality of sub-transport blocks based on a quantity of the plurality of slots, each slot of the plurality of slots corresponding to a set of sub-transport blocks of the plurality of sub-transport blocks; and
- program code to segment the plurality of sub-transport blocks into the plurality of code blocks.

26. The non-transitory computer-readable medium of claim 24, in which the program code further comprises program code to segment the plurality of code blocks based on a quantity of the plurality of slots, such that each slot is associated with one or more different code blocks of the plurality of code blocks.

* * * * *